(12) United States Patent
Ito

(10) Patent No.: US 10,486,683 B2
(45) Date of Patent: Nov. 26, 2019

(54) POWER SYSTEM AND METHOD FOR OPERATING POWER SYSTEM

(71) Applicant: HONDA MOTOR CO., LTD., Tokyo (JP)

(72) Inventor: Yoshihiro Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 15/696,092

(22) Filed: Sep. 5, 2017

(65) Prior Publication Data
US 2018/0086330 A1    Mar. 29, 2018

(30) Foreign Application Priority Data

Sep. 27, 2016   (JP) .................................. 2016-188916

(51) Int. Cl.
*B60W 20/13*   (2016.01)
*B60L 58/18*   (2019.01)
(Continued)

(52) U.S. Cl.
CPC .............. *B60W 20/13* (2016.01); *B60L 7/14* (2013.01); *B60L 15/007* (2013.01); *B60L 15/20* (2013.01);
(Continued)

(58) Field of Classification Search
CPC .......... B60L 50/15; B60L 58/18; B60L 58/20; B60L 58/21; B60L 58/22; B60W 20/13; H02J 7/1423; H02J 7/143; Y02T 10/7055
See application file for complete search history.

(56) References Cited

U.S. PATENT DOCUMENTS 5,788,006 A * 8/1998 Yamaguchi ............ B60K 6/365
                                                  180/65.235
2002/0158513 A1* 10/2002 Amano ............... F02N 11/0866
                                                  307/10.6
(Continued)

FOREIGN PATENT DOCUMENTS

JP    2002-325377    11/2002
JP    2007-282357    10/2007
(Continued)

OTHER PUBLICATIONS

Japanese Office Action for corresponding JP Application No. 2016-188916, dated Jul. 31, 2018 (w/ English machine translation).
(Continued)

*Primary Examiner* — Behrang Badii
*Assistant Examiner* — David A Testardi
(74) *Attorney, Agent, or Firm* — Mori & Ward, LLP

(57) ABSTRACT

A power system includes: an internal combustion engine; an electric motor; a power generator to drive a driven load; a power transmission mechanism via which power is transmitted from the internal combustion engine, the electric motor, and the power generator to the driven load and via which power is transmitted between the internal combustion engine and the power generator; a first power storage and a second power storage to store electric power; a power transmission circuit electrically connecting the electric motor, the power generator, the first power storage, and the second power storage so as to transmit electric power from the first power storage and the second power storage to the electric motor and the power generator; and a processor configured to control the power transmission circuit such that the first power storage and the second power storage feed electric power to the electric motor and the power generator.

26 Claims, 6 Drawing Sheets

(51) Int. Cl.

| | |
|---|---|
| *B60L 15/00* | (2006.01) |
| *B60W 10/06* | (2006.01) |
| *B60W 10/08* | (2006.01) |
| *B60W 10/26* | (2006.01) |
| *B60L 7/14* | (2006.01) |
| *B60L 15/20* | (2006.01) |
| *B60L 50/15* | (2019.01) |
| *B60L 58/12* | (2019.01) |
| *F02B 63/04* | (2006.01) |

(52) U.S. Cl.
CPC .......... *B60L 15/2054* (2013.01); *B60L 50/15* (2019.02); *B60L 58/12* (2019.02); *B60L 58/18* (2019.02); *B60W 10/06* (2013.01); *B60W 10/08* (2013.01); *B60W 10/26* (2013.01); *B60L 2210/10* (2013.01); *B60L 2210/30* (2013.01); *B60L 2210/40* (2013.01); *B60L 2240/12* (2013.01); *B60L 2240/42* (2013.01); *B60L 2240/44* (2013.01); *B60L 2240/52* (2013.01); *B60L 2240/54* (2013.01); *B60W 2510/0666* (2013.01); *B60W 2510/085* (2013.01); *B60W 2510/244* (2013.01); *B60W 2520/10* (2013.01); *B60W 2710/0677* (2013.01); *B60W 2710/086* (2013.01); *B60W 2710/242* (2013.01); *B60Y 2200/92* (2013.01); *F02B 63/04* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/93* (2013.01)

(56) References Cited

U.S. PATENT DOCUMENTS

| | | | | |
|---|---|---|---|---|
| 2004/0251065 | A1* | 12/2004 | Komiyama | B60K 6/365 180/65.23 |
| 2006/0250902 | A1* | 11/2006 | Bender | B60L 58/20 369/1 |
| 2009/0067202 | A1* | 3/2009 | Ichikawa | B60L 15/2045 363/79 |
| 2010/0100265 | A1* | 4/2010 | Kato | B60K 6/445 701/22 |
| 2010/0181125 | A1* | 7/2010 | Wang | B60L 58/20 180/65.22 |
| 2011/0082611 | A1* | 4/2011 | Shiba | B60K 6/445 701/22 |
| 2012/0049771 | A1* | 3/2012 | Komatsu | B60L 58/20 318/139 |
| 2012/0072063 | A1* | 3/2012 | Kato | B60K 6/445 701/22 |
| 2012/0091930 | A1* | 4/2012 | Takahashi | H02J 7/0013 318/139 |
| 2012/0109442 | A1* | 5/2012 | Kato | B60W 10/26 701/22 |
| 2012/0143425 | A1* | 6/2012 | Yamamoto | B60L 58/20 701/22 |
| 2013/0012347 | A1* | 1/2013 | Ortmann | B60K 6/442 475/5 |
| 2015/0183325 | A1* | 7/2015 | Mitsutani | B60L 58/20 307/10.1 |
| 2015/0258980 | A1* | 9/2015 | Hung | B60W 10/06 701/22 |
| 2015/0314685 | A1* | 11/2015 | Imamura | B60L 58/21 318/504 |
| 2016/0006377 | A1* | 1/2016 | Hashimoto | B60L 3/12 290/31 |
| 2016/0052505 | A1* | 2/2016 | Zhou | B60L 7/14 701/22 |
| 2016/0264124 | A1* | 9/2016 | Hotta | B60K 6/445 |
| 2017/0120740 | A1* | 5/2017 | Dufford | B60K 6/28 |
| 2017/0257052 | A1* | 9/2017 | Yamamoto | B60K 6/445 |

FOREIGN PATENT DOCUMENTS

| | | | | |
|---|---|---|---|---|
| JP | 4179351 | B2 | | 1/2008 |
| JP | 2008061405 | A | * | 3/2008 |
| JP | 2008-113507 | | | 5/2008 |
| JP | 2008113507 | A | * | 5/2008 ............ B60K 6/28 |
| JP | 2010-083351 | | | 4/2010 |
| JP | 2010-241377 | | | 10/2010 |
| JP | 2012060884 | A | * | 3/2012 |
| JP | 2012-111267 | | | 6/2012 |
| JP | 5842486 | B2 | | 3/2013 |
| JP | 5772781 | B2 | | 5/2014 |
| JP | 2014-218202 | | | 11/2014 |
| JP | 2014218202 | A | * | 11/2014 |

OTHER PUBLICATIONS

Japanese Office Action for corresponding JP Application No. 2016-188916, dated Mar. 6, 2018.

* cited by examiner

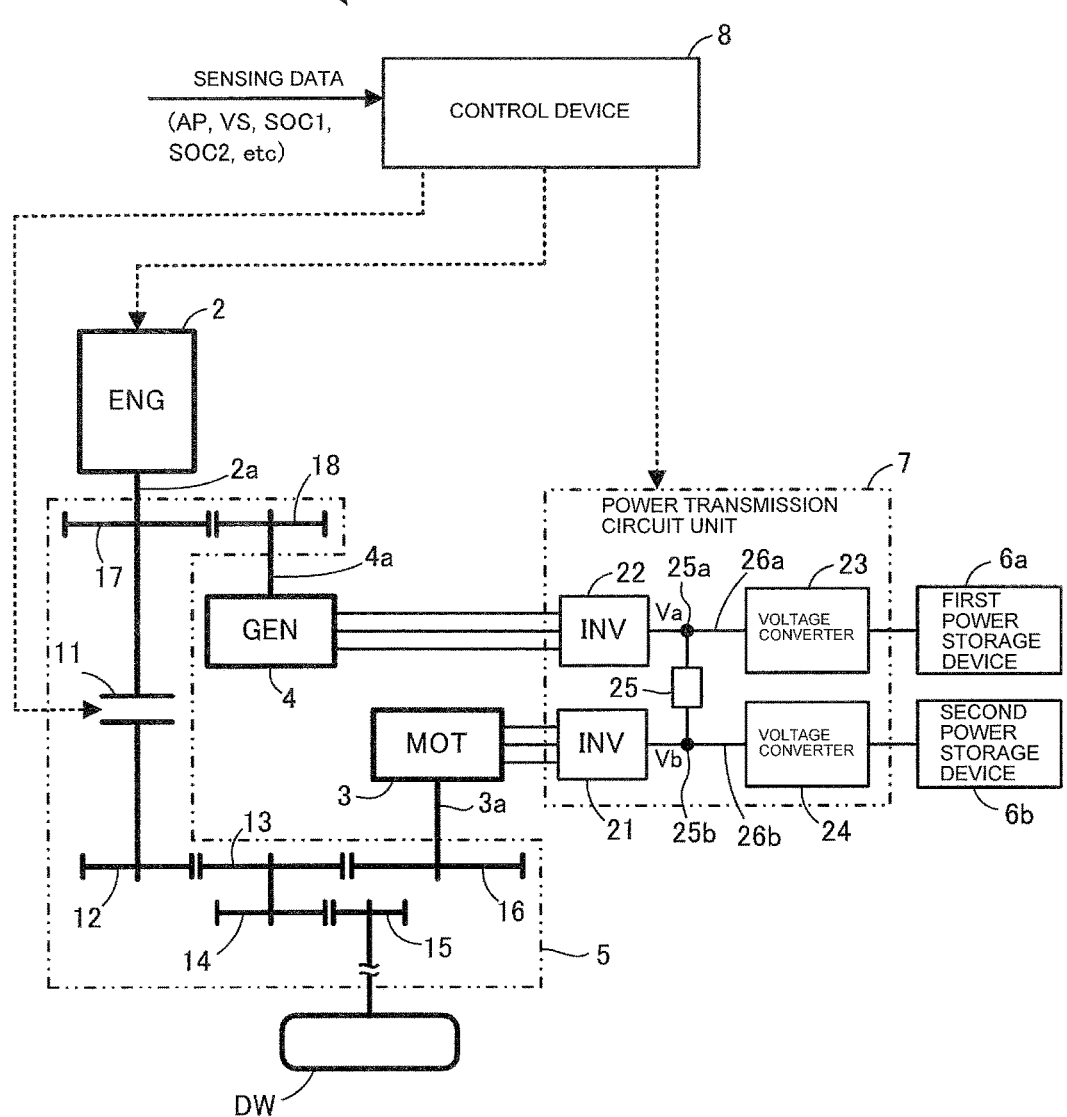

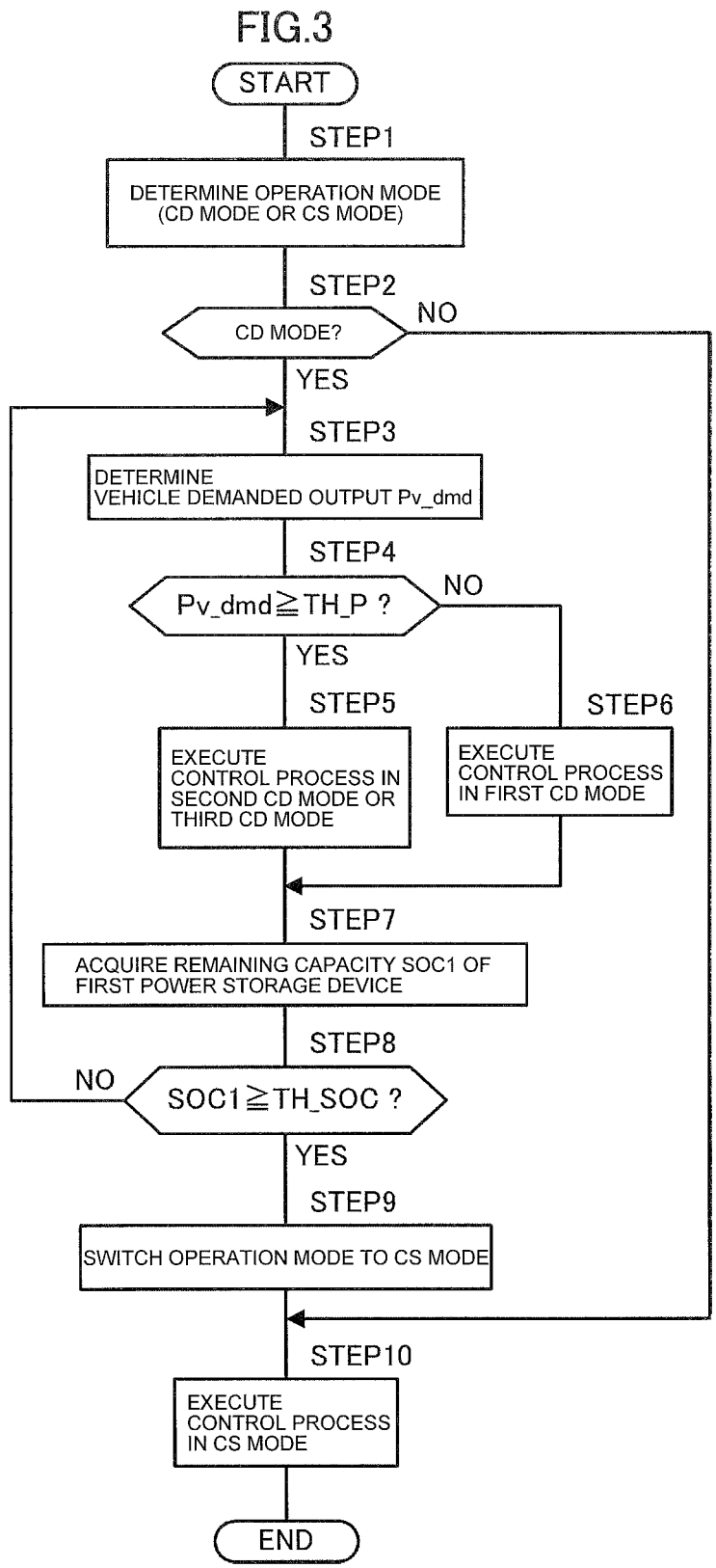

POWER SYSTEM AND METHOD FOR OPERATING POWER SYSTEM

CROSS-REFERENCE TO RELATED APPLICATIONS

The present application claims priority under 35 U.S.C. § 119 to Japanese Patent Application No. 2016-188916, filed Sep. 27, 2016. The contents of this application are incorporated herein by reference in their entirety.

BACKGROUND OF THE INVENTION

Field of the Invention

The present invention relates to a power system and to a method for operating a power system.

Discussion of the Background

For example, hybrid vehicles equipped with a power system including an internal combustion engine, a first motor/generator, and a second motor/generator have been heretofore known as found in Japanese Patent No. 4179351, 5772781, and 5842486. Japanese Patent No. 4179351 and 5772781 describe hybrid vehicles equipped with two power storage devices as a power supply of the second motor/generator used as a traveling drive source.

SUMMARY

According to one aspect of the present invention, a power system includes an internal combustion engine; an electric motor which is capable of performing a power running operation; a power generator which is capable of performing a power generating operation and a power running operation; a power transmission mechanism to which output shafts of the respective internal combustion engine, electric motor, and power generator are connected, which is capable of transmitting power of each of three power sources composed of the internal combustion engine, the electric motor, and the power generator to a driven load, and which is capable of transmitting power between the internal combustion engine and the power generator; a first power storage device and a second power storage device which respectively store power able to be fed to the electric motor and power able to be fed to the power generator; a power transmission circuit unit which is electrically connected to the electric motor, the power generator, and the first and second power storage devices so as to transmit power among the electric motor, the power generator, and the first and second power storage devices; and a control device which is configured to control operations of the respective internal combustion engine, electric motor, and power generator, the system being characterized in that the control device functions to execute a first control process of making both the electric motor and the power generator perform power running operations so as to transmit power of both the electric motor and the power generator to the driven load and, in the first control process, controls the power transmission circuit unit so as to feed power to the electric motor and the power generator using power of both the first power storage device and the second power storage device.

According to another aspect of the present invention, a power system includes: an internal combustion engine to drive a driven load; an electric motor to drive the driven load; a power generator to generate electric power and to drive the driven load; a power transmission mechanism via which power is transmitted from the internal combustion engine, the electric motor, and the power generator to the driven load and via which power is transmitted between the internal combustion engine and the power generator; a first power storage and a second power storage to store electric power fed to the electric motor and to the power generator; a power transmission circuit electrically connecting the electric motor, the power generator, the first power storage, and the second power storage so as to transmit electric power from the first power storage and the second power storage to the electric motor and the power generator; and a processor configured to control the power transmission circuit such that the first power storage and the second power storage feed electric power to the electric motor and the power generator.

According to further aspect of the present invention, a method for operating a power system is described. The power system includes: an internal combustion engine to drive a driven load; an electric motor to drive the driven load; a power generator to generate electric power and to drive the driven load; and a power transmission mechanism via which power is transmitted from the internal combustion engine, the electric motor, and the power generator to the driven load and via which power is transmitted between the internal combustion engine and the power generator. The method includes: storing electric power in a first power storage and a second power storage; and feeding electric power from the first power storage and the second power storage to the electric motor and the power generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a diagram illustrating the overall configuration of a power system according to an embodiment of the present invention.

FIG. 3 is a flowchart illustrating a process of a control device illustrated in FIG. 1.

DESCRIPTION OF THE EMBODIMENTS

Figure 2A:
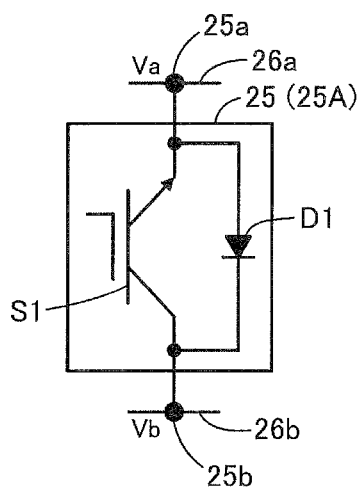
FIGS. 2A, 2B, and 2C are diagrams each illustrating a configuration example of a current path controller 25 illustrated in FIG. 1.

The embodiments will now be described with reference to the accompanying drawings, wherein like reference numerals designate corresponding or identical elements throughout the various drawings.

An embodiment of the present invention is described below with reference to FIGS. 1 to 7. Referring to FIG. 1, a power system 1 of this embodiment is a system mounted in a vehicle (specifically a hybrid vehicle) as an example of transport equipment.

The power system 1 includes: an internal combustion engine 2, an electric motor 3, and a power generator 4 which are each capable of generating power to drive driving wheels DW as a driven load to rotate; a power transmission mechanism 5 to which output shafts 2a, 3a, 4a of the respective internal combustion engine 2, electric motor 3, and power generator 4 are connected; a first power storage device 6a and a second power storage device 6b which store power for power running operations of the electric motor 3 and the power generator 4; a power transmission circuit unit 7 which is configured to transmit power between the electric motor 3 or the power generator 4 and the power storage device 6a or 6b; and a control device 8 which functions to control the operation of the power system 1.

The internal combustion engine 2 (hereinafter referred to as the engine 2) has a single or multiple cylinders (not illustrated), and generates power (rotational driving force) to the output shaft 2a of the engine 2 by combustion of fuel in the cylinder (s). The power generated by the engine 2 is used for driving the driving wheels DW or driving the power generator 4.

The electric motor 3 performs a power running operation while receiving power supply to generate power (rotational driving force) to the output shaft 3a of the electric motor 3. The power generated by the electric motor 3 is used for driving the driving wheels DW. In addition, in a state where the output shaft 3a of the electric motor 3 is driven to rotate by vehicle's kinetic energy transmitted from the driving wheels DW side, the electric motor can also perform a regenerative operation for outputting regenerative power.

The power generator 4 performs a power generating operation by driving its output shaft 4a to rotate by means of power of the engine 2. The generated power output from the power generator 4 through this power generating operation is used as power to charge the first power storage device 6a or the second power storage device 6b, or as power for the power running operation of the electric motor 3.

In addition, the power generator 4 can also perform a power running operation while receiving power supply and, at the time of the power running operation, it generates power (rotational driving force) to the output shaft 4a. The power generated by the power generator 4 is used for driving the driving wheels DW or driving the output shaft 2a to rotate at the time of starting the engine 2 (so-called cranking).

The power transmission mechanism 5 is capable of transmitting power, input from the output shafts 2a, 3a, 4a of the respective engine 2, electric motor 3, and power generator 4, to the driving wheels DW, and to be capable of transmitting power between the engine 2 and the power generator 4, In this embodiment, the power transmission mechanism 5 is capable of transmitting power of the internal combustion engine 2 from the output shaft 2a to the driving wheels DW by a power transmission mechanism including: a clutch 11 which is selectively operable between a connected mode in which power transmission is available and a disconnected mode in which power transmission is disconnected; and multiple gears 12, 13, 14, 15.

The clutch 11 is coupled to the output shaft 2a of the engine 2. Among the multiple gears 12 to 15, the gear 12 is coupled to the output shaft 2a of the engine 2 so as to be rotatable integrally with the output shaft 2a when the clutch 11 is in the connected mode. In addition, the gears 13, 14 are concentrically coupled to each other so as to be rotatable together. Out of the gears 13, 14, the gear 13 meshes with the gear 12, and the gear 14 meshes with the gear 15 which is rotatable in conjunction with the driving wheels DW.

Here, the gear 15 is connected to the multiple driving wheels DW via a differential gear device (not illustrated) so that it can distribute power, transmitted from the gear 14 side, to the multiple driving wheels DW. Note that FIG. 1 typically describes only one driving wheel DW.

Thereby, when the clutch 11 is in the connected mode, power of the engine 2 can be transmitted from the output shaft 2a to the driving wheels DW via the clutch 11 and the gears 12, 13, 14, 15 in this order.

The power transmission mechanism 5 is also capable of transmitting power of the electric motor 3 from the output shaft 3a to the driving wheels DW by a power transmission mechanism including: the gears 13, 14, 15 which are a part of the constituents of the power transmission mechanism from the engine 2 to the driving wheels DW (the constituents closer to the driving wheels DW than the clutch 11); and a gear 16.

In this case, the gear 16 is concentrically coupled to the output shaft 3a of the electric motor 3 so as to be rotatable integrally with the output shat 3a, and meshes with the gear 13.

Thereby, power of the electric motor 3 can be transmitted from the output shaft 3a to the driving wheels DW via the gears 16, 13, 14, 15 in this order.

Note that the gear 16 may mesh with another gear (e.g., the gear 12 or 14) provided in a power transmission path from the clutch 11 to the gear 15.

The power transmission mechanism 5 is also capable of transmitting power between the internal combustion engine 2 and the power generator 4 by a power transmission mechanism including gears 17, 18, and capable of transmitting power of the power generator 4 from the output shaft 4a to the driving wheels DW via the gears 17, 18 and the power transmission mechanism from the engine 2 to the driving wheels DW.

In this case, out of the gears 17, 18, the gear 17 is concentrically coupled to the output shaft 2a of the engine 2 between the clutch 11 and the engine 2 so as to be rotatable integrally with the output shaft 2a. In addition, the gear 18 is concentrically coupled to the output shaft 4a of the power generator 4 so as to be rotatable integrally with the output shaft 4a, and meshes with the gear 17.

Thereby, power transmission between the internal combustion engine 2 and the power generator 4 is possible via the gears 17, 18 irrespective of the operation mode of the clutch 11 (irrespective of whether the clutch 11 is in the connected mode or the disconnected mode), and their output shafts 2a, 4a rotate in conjunction with each other.

In addition, when the clutch 11 is in the connected mode, power of the power generator 4 can be transmitted from the output shaft 4a to the driving wheels DW via the gears 18, 17, the clutch 11, and the gears 12, 13, 14, 15 in this order.

In this embodiment, because the power transmission mechanism 5 has the above configuration, power of each of the three power sources, i.e., the engine 2, the electric motor 3, and the power generator 4, can be transmitted to the driving wheels DW irrespective of whether or not other power sources generate power.

Specifically, in a state where any one of the three power sources, i.e., the engine 2, the electric motor 3, and the power generator 4 generates power, this configuration can transmit this power to the driving wheels DW; on the other hand, in a state where two or more of the three power sources generate power, it can transmit the combined power to the driving wheels DW.

Note that power is transmitted from the engine 2 or the power generator 4 to the driving wheels DW when the clutch 11 is in the connected mode.

Incidentally, a power transmission mechanism capable of transmitting power of each of the engine 2, the electric motor 3, and the power generator 4 to the driving wheels DW in the above manner is not limited to the power transmission mechanism 5 having the configuration illustrated in FIG. 1.

For example, a power transmission constituent other than the gears (e.g., a pulley and a belt, or a sprocket and a chain) may be included in the power transmission path between the driving wheels DW and any of the power sources among the engine 2, the electric motor 3, and the power generator 4, and further a transmission may be included therein.

In addition, the output shaft 3*a* of the electric motor 3 may be coaxially coupled to or integrally configured with any of the rotation axes of the power transmission mechanism between the clutch 11 and the driving wheels DW (e.g., the rotation axis of the gear 12 or the rotation axes of the gears 13, 14), for example.

Further, the power transmission mechanism between the electric motor 3 and the driving wheels DW or the power transmission mechanism between the engine 2 and the power generator 4 may include a clutch.

The first power storage device 6*a* and the second power storage device 6*b* are power storage devices which are capable of being charged from an external power supply via a charger (not illustrated) provided in the vehicle, and which have different characteristics.

Specifically, the first power storage device 6*a* is a power storage device with higher energy density than the second power storage device 6*b* (so-called a high-capacity power storage device). The energy density is the amount of electric energy the device is capable of storing per unit weight or per unit volume. The first power storage device 6*a* can be constituted of a lithium-ion battery, for example.

On the other hand, the second power storage device 6*b* is a power storage device with higher power density than the first power storage device 6*a* (so-called a high-output power storage device). The power density is the amount of electricity the device is capable of outputting per unit weight or per unit volume (the amount of electric energy per unit time or the amount of electric charges per unit time). The second power storage device 6*b* can be constituted of, for example, a lithium-ion battery, a nickel-metal hydride battery, or a capacitor.

Here, an additional description is given of the difference in characteristics between the first power storage device 6*a* and the second power storage device 6*b*. The first power storage device 6*a* having relatively high energy density is capable of storing larger electric energy than the second power storage device 6*b*. In addition, the first power storage device 6*a* has such characteristics that the device is less prone to deteriorate when it discharges steadily in a mode where its output hardly varies than when it discharges in a mode where its output varies frequently. Further, the first power storage device 6*a* is less resistant to deterioration from charging (especially charging at high rate) (i.e., more prone to deteriorate due to charging) than the second power storage device 6*b*.

On the other hand, the second power storage device 6*b* having relatively high power density is capable of outputting a large amount of power instantaneously because it has lower internal resistance (impedance) than the first power storage device 6*a*. In addition, the second power storage device 6*b* is more resistant to deterioration from charging than the first power storage device 6*a*.

In the meantime, an additional description is given of the output performance of the first power storage device 6*a* and the second power storage device 6*b* (maximum power the device (s) is (are) capable of outputting). In this embodiment, in a second CD mode or a third CD mode to be described later, power running operations of both the electric motor 3 and the power generator 4 are performed in parallel using power of both the first power storage device 6*a* and the second power storage device 6*b*.

Further, in this embodiment, the first power storage device 6*a* and the second power storage device 6*b* are power storage devices having specifications such that maximum power each device is capable of outputting is smaller than required maximum power which is maximum power required for the power running operations of both the electric motor 3 and the power generator 4 in the second CD mode and the third CD mode (a maximum value of power obtained by summing up the amount of power to be fed to the electric motor 3 and the amount of power to be fed to the power generator 4), and that the sum of maximum power the first power storage device 6*a* is capable of outputting and maximum power the second power storage device 6*b* is capable of outputting is equal to or larger than the required maximum power.

In this embodiment, the power transmission circuit unit 7 includes: an inverter 21 which is connected to the electric motor 3; an inverter 22 which is connected to the power generator 4; voltage converters 23, 24 which are respectively connected to the first power storage device 6*a* and the second power storage device 6*b*; and a current path regulator 25 which is configured to control current path modes among the first power storage device 6*a*, the second power storage device 6*b*, the electric motor 3, and the power generator 4.

Note that the voltage converters 23, 24 respectively correspond to a first voltage converter and a second voltage converter.

The inverters 21, 22 are publicly known circuits configured to convert one of DC power and AC power to the other by controlling their switching elements with duty signals.

The inverter 21 on the electric motor 3 side has an AC input/output unit that is connected to the electric motor 3, and has a DC input/output unit that is connected to the second power storage device 6*b* via the voltage converter 24 and connected to the first power storage device 6*a* via the current path regulator 25 and the voltage converter 23.

During the power running operation of the electric motor 3, the inverter 21 can be controlled so as to convert DC power, input to the DC input/output unit of the inverter 21, to AC power and output the AC power from the AC input/output unit of the inverter 21 to the electric motor 3. Further, during the regenerative operation of the electric motor 3, the inverter 21 can be controlled so as to convert AC power (regenerative power), input to the AC input/output unit of the inverter 21 from the electric motor 3, to DC power and output the DC power from the DC input/output unit of the inverter 21.

The inverter 22 on the power generator 4 side has an AC input/output unit that is connected to the power generator 4, and has a DC input/output unit that is connected to the first power storage device 6*a* via the voltage converter 23 and connected to the second power storage device 6*b* via the current path regulator 25 and the voltage converter 24.

During the power generating operation of the power generator 4, the inverter 22 can be controlled so as to convert AC power (generated power), input to the AC input/output unit of the inverter 22 from the power generator 4, to DC power and output the DC power from the DC input/output unit of the inverter 22. During the power running operation of the power generator 4, the inverter 22 can be controlled so as to convert DC power, input to the DC input/output unit of the inverter 22, to AC power and output the AC power from the AC input/output unit of the inverter 22 to the power generator 4.

The voltage converters 23, 24 are publicly known circuits configured to perform voltage conversion of DC power by controlling their switching elements with duty signals (switching-type DC/DC converters). Each of the voltage converters 23, 24 can variably control the voltage conversion rate. The voltage converter 23 can perform bidirectional power transmission between the first power storage device 6a side and the inverters 21, 22 side, whereas the voltage converter 24 can perform bidirectional power transmission between the second power storage device 6b side and the inverters 21, 22 side.

In this embodiment, the voltage converter 24 connected to the second power storage device 6b having relatively high power density is a voltage converter having specifications such that maximum power it is capable of transmitting is larger than that of the voltage converter 23 connected to the first power storage device 6a having relatively high energy density.

Further, in this embodiment, the voltage converters 23, 24 are voltage converters having specifications such that maximum power each converter is capable of transmitting is smaller than required maximum power which is maximum power required for the power running operations of both the electric motor 3 and the power generator 4 in the second CD mode and the third CD mode to be described later, and that the sum of maximum power the voltage converter 23 is capable of transmitting and maximum power the voltage converter 24 is capable of transmitting is equal to or larger than the required maximum power.

The current path regulator 25 has a first terminal 25a and a second terminal 25b. The first terminal 25a is in conduction with a current path 26a for allowing a current to flow through between the inverter 22 on the power generator 4 side and the voltage converter 23 on the first power storage device 6a side, whereas the second terminal 25b is in conduction with a current path 26b for allowing a current to flow through between the inverter 21 on the electric motor 3 side and the voltage converter 24 on the second power storage device 6b side.

The current path 26a is, in other words, a current path through which a flowing current (a discharging current or a charging current) of the first power storage device 6a flows at the time of discharging or charging of the first power storage device 6a, and the current path 26b is, in other words, a current path through which a flowing current (a discharging current or a charging current) of the second power storage device 6b flows at the time of discharging or charging of the second power storage device 6b. Note that the current path 26a corresponds to a first current path, and the current path 26b corresponds to a second current path.

Since the first terminal 25a and the second terminal 25b of the current path regulator 25 are respectively in conduction with the current paths 26a, 26b, an electric potential Va at the first terminal 25a of the current path regulator 25 coincides with a generated voltage at the DC input/output unit of the inverter 22 (i.e., a generated voltage at the DC input/output unit of the voltage converter 23 on the inverter 22 side), and an electric potential Vb at the second terminal 25b thereof coincides with a generated voltage at the DC input/output unit of the inverter 21 (i.e., a generated voltage at the DC input/output unit of the voltage converter 24 on the inverter 21 side).

In addition, the current path regulator 25 is capable of achieving: a decoupled mode in which the current paths 26a, 26b are electrically decoupled from each other and the flow of current through between them (the flow of current through the current path regulator 25) is blocked; and a current-flow available mode in which the current paths 26a, 26b are electrically connected to each other and the flow of current through between them is available.

Figure 2B:
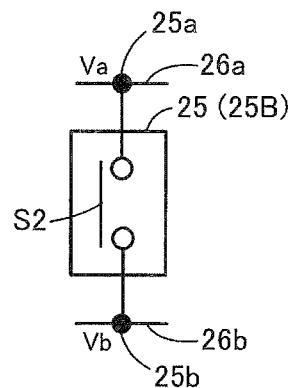
Figure 2C:
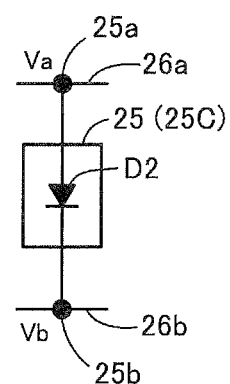

For example, the current path regulator 25 described above may employ any one of configurations illustrated in FIGS. 2A, 2B, and 2C.

A current path regulator 25A illustrated in FIG. 2A has a configuration in which a semiconductor switch element S1 such as an FET and a diode D1 are connected in parallel between the first terminal 25a and the second terminal 25b. In this case, the forward direction of the diode D1 is a direction from the first terminal 25a side toward the second terminal 25b, and the semiconductor switch element S1 allows a current to flow from the second terminal 25b side toward the first terminal 25a while it is on.

In the current path regulator 25A described above, the decoupled mode is achieved when the electric potentials Va, Vb at the respective first and second terminals 25a, 25b satisfy Va≤Vb and the semiconductor switch element S1 is off; on the other hand, the current-flow available mode is achieved when Va>Vb is satisfied or the semiconductor switch element S1 is on.

Note that, in the current-flow available mode achieved in a state where Va>Vb is satisfied and the semiconductor switch element S1 is off, a current is allowed to flow only in a single direction from the current path 26a side toward the current path 26b; on the other hand, in the current-flow available mode achieved in a state where the semiconductor switch element S1 is on, a current is allowed to flow bidirectionally between the current paths 26a, 26b.

A current path regulator 25B illustrated in FIG. 2B has a configuration in which a contact-type switch element S2 such as a relay switch is interposed between the first terminal 25a and the second terminal 25b. In the current path regulator 25B described above, the decoupled mode is achieved when the contact-type switch element S2 is off, and the current-flow available mode is achieved when the contact-type switch element S2 is on. In this case, in the current-flow available mode, a current is allowed to flow bidirectionally between the current paths 26a, 26b.

A current path regulator 25C illustrated in FIG. 2C has a configuration in which a diode D2 is interposed between the first terminal 25a and the second terminal 25b. In this case, the forward direction of the diode D2 is a direction from the first terminal 25a side toward the second terminal 25b.

In the current path regulator 25C described above, the decoupled mode is achieved when the electric potentials Va, Vb at the respective first and second terminals 25a, 25b satisfy Va≤Vb, and the current-flow available mode is achieved when Va>Vb is satisfied. In this case, in the current-flow available mode, a current is allowed to flow only in a single direction from the current path 26a side toward the current path 26b.

As described above, either of the current path regulators 25A, 25B, 25C can achieve the decoupled mode and the current-flow available mode. Here, in this embodiment, the first power storage device 6a is connected to the inverter 22 on the power generator 4 side via the voltage converter 23, and the second power storage device 6b is connected to the inverter 21 on the electric motor 3 side via the voltage converter 24. For this reason, in the decoupled mode, the first power storage device 6a can exchange power with only the power generator 4 out of the electric motor 3 and the power generator 4, and the second power storage device 6b can exchange power with only the electric motor 3 out of the electric motor 3 and the power generator 4.

Incidentally, in the power transmission circuit unit 7, any one of the voltage converters 23, 24 may be omitted depending on, for example, the relationship in magnitude between the output voltage of the first power storage device 6a and that of the second power storage device 6b. For example, the voltage converter 23 may be omitted if the output voltage of the first power storage device 6a is larger than the output voltage of the second power storage device 6b and larger than a power supply voltage required for the power running operation of the electric motor 3.

Returning back to FIG. 1, the control device 8 is composed of an electronic circuit unit including a CPU, a RAM, a ROM, an interface circuit, and the like. Here, the control device 8 may be composed of multiple electronic circuit units which can communicate with one another.

The control device 8 controls the operation of the power system 1 by controlling the operations of the engine 2, the electric motor 3, the power generator 4, and the clutch 11 respectively by means of functions achieved by a hardware configuration or programs (software configuration) mounted in the device. In this case, the operation of the engine 2 is controlled via a fuel supply system (not illustrated), a throttle valve actuator, and the like, and switching of the operation modes of the clutch 11 is controlled via an actuator (not illustrated). In addition, the operations of the electric motor 3 and the power generator 4 are controlled via the power transmission circuit unit 7.

Here, in this embodiment, the operation mode which defines how to control the operation of the power system 1 includes the Charge Depleting (CD) mode and a Charge Sustaining (CS) mode.

The CD mode is an operation mode of consuming power stored in the first power storage device 6a (decreasing a remaining capacity in the power storage device 6) by using the electric motor 3 as a main power source for driving the driving wheels DW and feeding power to the electric motor 3 mainly from the first power storage device 6a.

Here, consuming power stored in the first power storage device 6a is not limited to simply decreasing the remaining capacity in the first power storage device 6a, but may include a period in which the remaining capacity in the first power storage device 6a is temporarily increased by power generated by the power generator 4 or charging of regenerative power from the electric motor 3.

Besides an operation mode of driving the driving wheels DW by using power of the electric motor 3 only (hereinafter referred to as the first CD mode), the CD mode includes: an operation mode of driving the driving wheels DW by supplementarily using power of the power generator 4 in addition to power of the electric motor 3 (hereinafter referred to as the second CD mode); and an operation mode of driving the driving wheels DW by supplementarily using power of the engine 2 and the power generator 4 in addition to power of the electric motor 3 (hereinafter referred to as the third CD mode).

Among these CD modes, the second CD mode and the third CD mode are each an operation mode used when propulsive force required according to a control input on a vehicle's accelerator and the like (driving force that the driving wheels DW are required to exert as a whole) is so large that the propulsive force is hard to achieve by merely power of the electric motor 3. The first CD mode is a regular operation mode among these CD modes.

In this embodiment, among the first CD mode, the second CD mode, and the third CD mode described above, control processes in the second CD mode and the third CD mode correspond to a first control process.

Note that the first CD mode may be an operation mode in which the engine 2 is kept stopped; however, the first CD mode may alternatively be an operation mode which makes it possible to carry out the operation of the engine 2 and the power generating operation of the power generator 4 using power of the engine 2 as needed when a remaining capacity in the first power storage device 6a or the second power storage device 6b becomes relatively small, for example, and feed the power thus generated by the power generator 4 to the electric motor 3 or charge it in the second power storage device 6b. In other words, the first CD mode may be an operation mode which enables the vehicle to travel as a series hybrid vehicle as needed.

In addition, among these CD modes, the operation mode of supplementarily using power of the power source other than the electric motor 3 may be only one of the second CD mode and the third CD mode. For example, if emission of exhaust gas of the engine 2 in the CD mode is prohibited by the law's regulations etc. or if the amount of emission of exhaust gas of the engine 2 is required to be minimized, only the second CD mode may be employed as the operation mode of supplementarily using power of the power source other than the electric motor 3.

The CS mode is an operation mode of driving the driving wheels DW so as to suppress a reduction in a remaining capacity in the first power storage device 6a by using the engine 2 as a main power source for driving the driving wheels DW. Besides an operation mode of driving the driving wheels DW by using power of the engine 2 only, the CS mode includes an operation mode of driving the driving wheels DW by supplementarily using power of the electric motor 3 in addition to power of the engine 2 (i.e., an operation mode of making the vehicle travel as a parallel hybrid vehicle). When power of the electric motor 3 is used supplementarily, power of the second power storage device 6b is used as its main power supply power.

To the control device 8, various sensing data are input as information necessary for executing the control processes in these CD mode and CS mode. In this embodiment, the sensing data include data indicating detected values of, for example: a control input AP on a vehicle's acceleration pedal (hereinafter referred to as the accelerator control input AP); a vehicle speed VS; a remaining capacity SOC1 (SOC: State of Charge) in the first power storage device 6a; and a remaining capacity SOC2 in the second power storage device 6b.

Here, the control device 8 may also have a function as a detector configured to detect (estimate) the remaining capacities SOC1, SOC2 of the respective first and second power storage devices 6a, 6b. In this case, to the control device 8, sensing data for estimating the SOC1 (for example, data indicating detected values of the voltage, current, temperature, etc. of the first power storage device 6a) and sensing data for estimating the SOC2 (for example, data indicating detected values of the voltage, current, temperature, etc. of the second power storage device 6b) are input instead of the sensing data indicating the detected values of the remaining capacities SOC1, SOC2.

Hereinbelow, the control process of the control device 8 is described specifically.

Once the vehicle starts operating (the control device 8 is activated), the control device 8 executes the process illustrated in the flowchart of FIG. 3.

At STEP 1, the control device 8 determines the operation mode of the power system 1 (the CD mode or the CS mode). In this case, for example, the control device 8 determines to set the CD mode as the operation mode of the power system 1 if the remaining capacity SOC1 (detected value) in the first power storage device 6a is equal to or larger than a predetermined threshold TH_SOC, and determines to set the CS mode as the operation mode of the power system 1 if the remaining capacity SOC1 is smaller than the threshold TH_SOC.

Next, at STEP 2, the control device 8 judges whether or not the determined operation mode is the CD mode. Then, if the judgment result is positive (if the operation mode is the CD mode), the control device 8 executes processes from STEP 3; if the judgment result is negative (if the operation mode is the CS mode), the control device executes a process of STEP 10.

At STEP 3, the control device 8 determines a vehicle demanded output Pv_dmd, representing vehicle's propulsive energy (the amount of energy required per unit time), based on the detected values of the vehicle's accelerator control input AP and the vehicle speed VS by use of a map created in advance, arithmetic expressions, and the like.

Next, at STEP 4, the control device 8 judges whether or not the vehicle demanded output Pv_dmd is a large value equal to or larger than a predetermined value TH_P.

If the judgment result at STEP 4 is negative (if Pv_dmd<TH_P is satisfied), the vehicle is in a regular traveling state such as traveling in cruise control. In this case, the control device 8 executes the control process in the first CD mode at STEP 6.

On the other hand, if the judgment result is positive (if Pv_dmd≥TH_P is satisfied), the vehicle is in a state where it needs to accelerate relatively largely. In this case, the control device 8 executes the control process in the second CD mode or the third CD mode at STEP 5.

For example, the process at STEP 6 (the control process in the first CD mode) is executed as follows.

The control device 8 determines the target output (a target value of output energy per unit time) of the electric motor 3 so that the vehicle demanded output Pv_dmd may be achieved by power of the electric motor 3 only. Further, out of the amount of power the electric motor 3 should feed in response to the target output of the electric motor 3, the control device 8 determines the amount of power for which the first power storage device 6a is responsible (the amount of power to be supplied to the electric motor 3 from the first power storage device 6a) and the amount of power for which the second power storage device 6b is responsible (the amount of power to be supplied to the electric motor 3 from the second power storage device 6b) according to the target output of the electric motor 3, the remaining capacity SOC1 of the first power storage device 6a, the remaining capacity SOC2 of the second power storage device 6b, and the like.

For example, if the vehicle demanded output Pv_dmd is equal to or smaller than the predetermined value, the amount of power for which the first power storage device 6a is responsible is determined so that power may be fed to the electric motor 3 from the first power storage device 6a only (the amount of power for which the second power storage device 6b is responsible is zero). On the other hand, if the vehicle demanded output Pv_dmd exceeds the predetermined value, the amount of power for which each of the first power storage device 6a and the second power storage device 6b is responsible is determined so that power may be fed to the electric motor 3 from both the first power storage device 6a and the second power storage device 6b.

Note that, in order to suppress deterioration of the first power storage device 6a as much as possible, it is preferable that the amount of power for which the first power storage device 6a is responsible be determined so that fluctuations in output power (discharge power) of the first power storage device 6a may be suppressed as much as possible. Further, when the remaining capacity SOC2 of the second power storage device 6b is large, for example, the amount of power for which the first power storage device 6a is responsible may be set at zero.

The control device 8 controls one of or both of the voltage converters 23, 24 and the inverter 21 so as to achieve the amount of power for which each of the first power storage device 6a and the second power storage device 6b is responsible determined as described above.

In this case, when the current path regulator 25 is the current path regulator 25B illustrated in FIG. 2B, the control device 8 performs control to turn on the contact-type switch element S2 if the amount of power for which the first power storage device 6a is responsible is not zero.

In addition, irrespective of which of the current path regulators 25A, 25B, 25C illustrated in FIGS. 2A to 2C serves as the current path regulator 25, the control device 8 controls the voltage converters 23, 24 so that an output voltage of the voltage converter 23 (Va) may be higher than an output voltage of the voltage converter 24 (Vb) by the amount of voltage drop at the current path regulator 25 if the amount of power for which both the first power storage device 6a and the second power storage device 6b are responsible is not zero.

Figure 4:
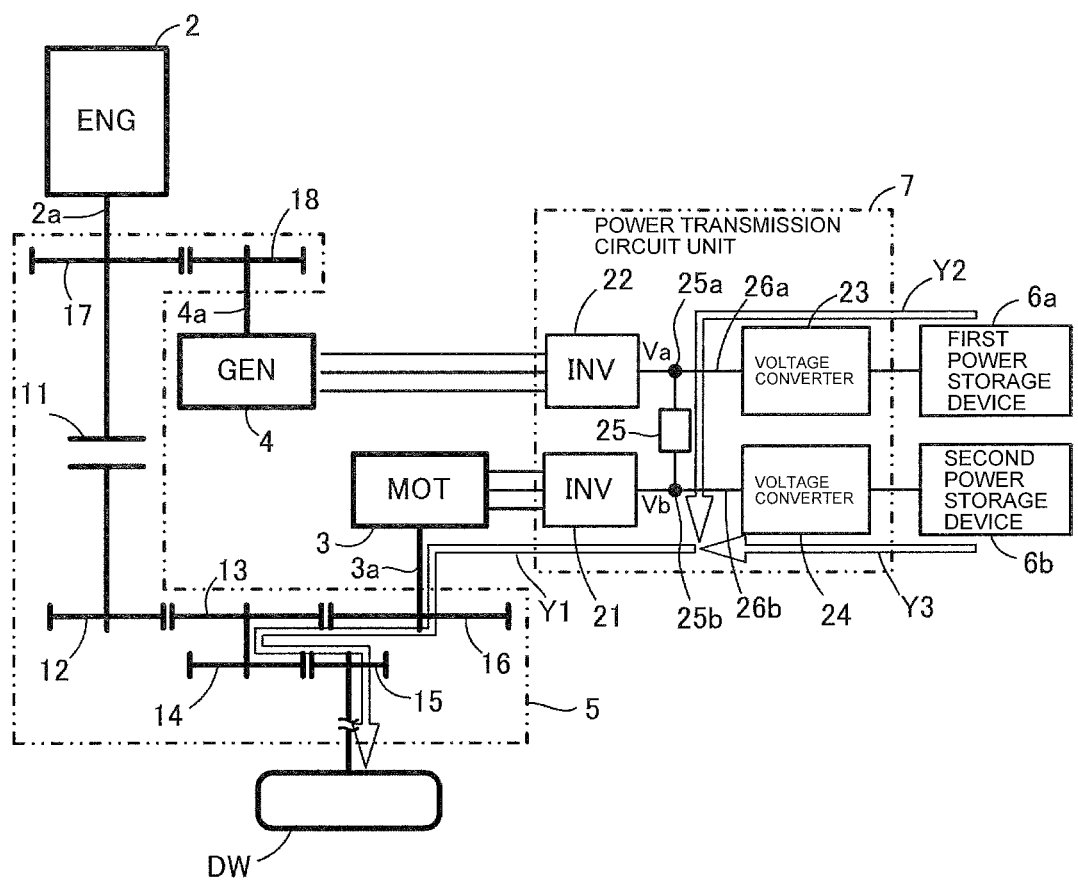
FIG. 4 is a diagram exemplifying the flow of energy observed when power is output from an electric motor of the power system according to the embodiment.

The control process in the first CD mode is executed as described above. FIG. 4 illustrates the flow of energy in the first CD mode with arrows Y1 to Y3. As illustrated in the drawing, in the first CD mode, energy from one of or both of the first power storage device 6a and the second power storage device 6b is converted into mechanical energy in the electric motor 3, and then the converted energy is transmitted to the driving wheels DW from the electric motor 3.

The control process at STEP 5 (the control process in the second CD mode or the third CD mode) is executed as follows, for example.

For example, the control device 8 executes the control process in the second CD mode if the vehicle demanded output Pv_dmd is larger than the predetermined value TH_P and equal to or smaller than a predetermined value TH_P2, and executes the control process in the third CD mode if the vehicle demanded output is larger than the predetermined value TH_P2.

In the control process in the second CD mode, the control device 8 determines the target outputs (target values of output energy per unit time) of the respective electric motor 3 and power generator 4 so that the vehicle demanded output Pv_dmd may be achieved by power of both the electric motor 3 and the power generator 4.

For example, the control device 8 determines the target output of the power generator 4 so that the power generator 4 may be responsible for a predetermined value smaller than the vehicle demanded output Pv_dmd, and then determines the target output of the electric motor 3 so that the electric motor 3 may be responsible for an output obtained by subtracting the output for which the power generator 4 is responsible from the vehicle demanded output Pv_dmd.

Here, since the second CD mode is the operation mode in the state where the engine 2 is stopped, power of the power generator 4 is partially consumed for driving the output shaft 2a of the engine 2 to rotate. For this reason, besides the part of the vehicle demanded output Pv_dmd, the amount of power loss to be consumed for driving the output shaft 2a of the engine 2 to rotate is added to the target output of the power generator 4.

Note that the part of the vehicle demanded output Pv_dmd for which the power generator 4 is responsible may be a previously set predetermined value (fixed value), for example, but this part for which the power generator is responsible may alternatively be set according to e.g. the remaining capacity SOC1 in the first power storage device 6a. In order to suppress deterioration of the first power storage device 6a as much as possible, it is preferable that this part for which the power generator is responsible be set so that high-frequency fluctuations may be suppressed as much as possible.

The control device 8 determines, as the amount of power for which the first power storage device 6a is responsible, the whole amount of power to be fed to the power generator 4 according to the target output of the power generator 4, and determines, as the amount of power for which the second power storage device 6b is responsible, the whole amount of power to be fed to the electric motor 3 according to the target output of the electric motor 3.

Then, the control device 8 makes the clutch 11 operate in the connected mode via the actuator. At the same time, the control device controls the voltage converter 23 and the inverter 22 so as to achieve the amount of power for which the first power storage device 6a is responsible, and controls the voltage converter 24 and the inverter 21 so as to achieve the amount of power for which the second power storage device 6b is responsible.

In this case, when the current path regulator 25 is the current path regulator 25A illustrated in FIG. 2A, the control device 8 keeps the semiconductor switch element S1 turned off, and controls the voltage converters 23, 24 so that an output voltage of the voltage converter 24 (Vb) may be slightly higher than an output voltage of the voltage converter 23 (Va). Thereby, the current path 26a on the first power storage device 6a side and the current path 26b on the second power storage device 6b side turn to the decoupled mode.

Meanwhile, when the current path regulator 25 is the current path regulator 25B illustrated in FIG. 2B, the control device 8 keeps the contact-type switch element S2 turned off. Thereby, the current path 26a on the first power storage device 6a side and the current path 26b on the second power storage device 6b side turn to the decoupled mode. Note that, in this case, it does not matter how the relationship between the magnitudes of an output voltage of the voltage converter 24 (Vb) and an output voltage of the voltage converter 23 (Va) is defined.

Meanwhile, when the current path regulator 25 is the current path regulator 25C illustrated in FIG. 2C, the control device 8 controls the voltage converters 23, 24 so that an output voltage of the voltage converter 24 (Vb) may be slightly higher than an output voltage of the voltage converter 23 (Va). Thereby, the current path 26a on the first power storage device 6a side and the current path 26b on the second power storage device 6b side turn to the decoupled mode.

Figure 5:
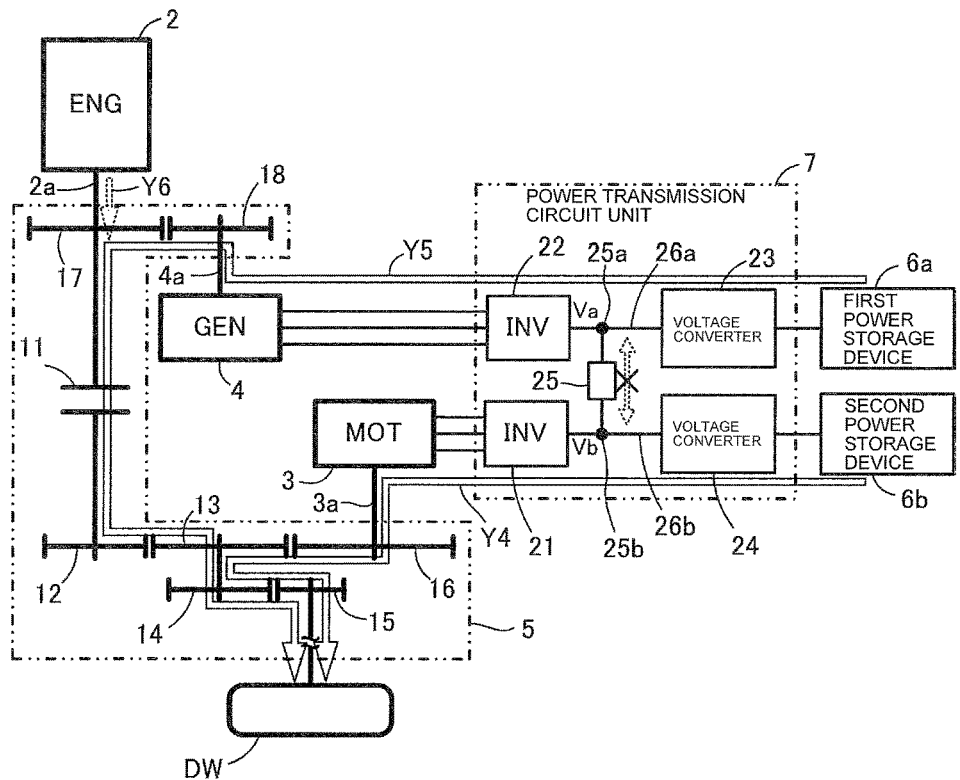
FIG. 5 is a diagram exemplifying the flow of energy observed when power is output from the electric motor and a power generator of the power system according to the embodiment.

The control process in the second CD mode is executed as described above. FIG. 5 illustrates the flow of energy in the second CD mode with arrows Y4, Y5. As illustrated in the drawing, in the second CD mode, energy from the first power storage device 6a is converted into mechanical energy in only the power generator 4 out of the electric motor 3 and the power generator 4, and then the converted energy is transmitted to the driving wheels DW from the power generator 4. Further, energy from the second power storage device 6b is converted into mechanical energy in only the electric motor 3 out of the electric motor 3 and the power generator 4, and then the converted energy is transmitted to the driving wheels DW from the electric motor 3.

In this case, since power is fed to the electric motor 3 from the second power storage device 6b with relatively high power density, it is possible to maximize the part of the vehicle demanded output Pv_dmd for which the electric motor 3 is responsible. Thus, the target output of the power generator 4 can be set so that the amount of discharge from the first power storage device 6a with relatively high energy density may be prevented from becoming excessively large, and can be set at a stable value.

This enables both the electric motor 3 and the power generator 4 to transmit a large amount of power to the driving wheels DW and, at the same time, enables the first power storage device 6a and the second power storage device 6b to discharge in ways suitable for the respective power storage devices.

Next, in the control process in the third CD mode, the control device 8 determines the target outputs (target values of output energy per unit time) of the respective engine 2, electric motor 3, and power generator 4 so that the vehicle demanded output Pv_dmd may be achieved by power of the three power sources, i.e., the engine 2, the electric motor 3, and the power generator 4.

For example, the control device 8 determines the target outputs of the respective engine 2 and power generator 4 so that the engine 2 and the power generator 4 may be responsible for a predetermined value smaller than the vehicle demanded output Pv_dmd, and then determines the target output of the electric motor 3 so that the electric motor 3 may be responsible for an output obtained by subtracting the output for which both the engine 2 and the power generator 4 are responsible from the vehicle demanded output Pv_dmd.

Further, the control device 8 determines, as the amount of power for which the first power storage device 6a is responsible, the whole amount of power to be fed to the power generator 4 according to the target output of the power generator 4, and determines, as the amount of power for which the second power storage device 6b is responsible, the whole amount of power to be fed to the electric motor 3 according to the target output of the electric motor 3.

Then, after starting the engine 2 as will be described later, the control device 8 makes the clutch 11 operate in the connected mode via the actuator, and controls the operation of the engine 2 so as to achieve the target output of the engine 2.

At the same time, the control device 8 controls the voltage converter 23 and the inverter 22 so as to achieve the amount of power for which the first power storage device 6a is responsible, and controls the voltage converter 24 and the inverter 21 so as to achieve the amount of power for which the second power storage device 6b is responsible.

In this case, as in the case of the second CD mode, the control related to the current path regulator 25 is performed so that the current path regulator 25 turns to the decoupled mode.

The control process in the third CD mode is executed as described above. FIG. 5 illustrates the flow of energy in the third CD mode with arrows Y4, Y5, Y6. In this case, the flow of energy from the first power storage device 6a and the second power storage device 6b to the driving wheels DW (arrows Y4, Y5) is the same as that in the case of the second CD mode. In the third CD mode, as illustrated with arrow Y6, power of the engine 2 is transmitted to the driving wheels DW in combination with power of the power generator 4.

In this case, as in the case of the second CD mode, since power is fed to the electric motor 3 from the second power storage device 6b with relatively high power density, it is possible to maximize the part of the vehicle demanded output Pv_dmd for which the electric motor 3 is responsible. Thus, the target output of the power generator 4 can be set so that the amount of discharge from the first power storage device 6a with relatively high energy density may be prevented from becoming excessively large, and can be set at a stable value. Further, the target output of the engine 2 can be set at a small value.

This enables both the electric motor 3 and the power generator 4 to transmit a large amount of power to the driving wheels DW and, at the same time, enables the first power storage device 6a and the second power storage device 6b to discharge in ways suitable for the respective power storage devices.

The control process for starting the engine 2 in the third CD mode is executed as follows.

In this embodiment, the engine 2 is started using the power generator 4 as a starting electric motor. In this case, when the current path regulator 25 is the current path regulator 25C illustrated in FIG. 2C, the power generator 4 can be operated as the starting electric motor by feeding power to the power generator 4 from the first power storage device 6a.

On the other hand, when the current path regulator 25 is the current path regulator 25A or 25B illustrated in FIG. 2A or FIG. 2B, it is also possible to feed power to the power generator 4 from the second power storage device 6b. Here, it is preferable that power of the first power storage device 6a with relatively high energy density be used as much as possible as energy for driving the driving wheels DW in the CD mode.

Figure 6:
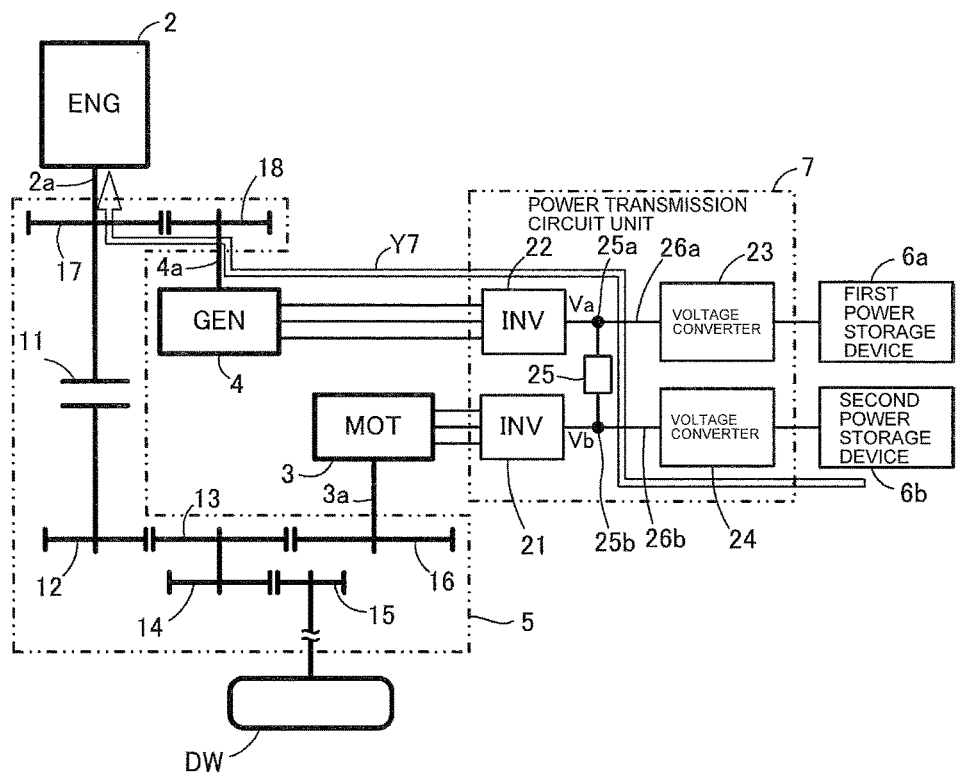
FIG. 6 is a diagram exemplifying the flow of energy at the time of starting an internal combustion engine of the power system according to the embodiment.

To this end, when the current path regulator 25 is the current path regulator 25A or 25B illustrated in FIG. 2A or FIG. 2B, the control device 8 operates the power generator 4 as the starting electric motor for the engine 2 by feeding power to the power generator 4 from the second power storage device 6b, as illustrated with arrow Y7 of FIG. 6.

More specifically, when the current path regulator 25 is the current path regulator 25A illustrated in FIG. 2A, the control device 8 performs control to turn on the semiconductor switch element S1; when the current path regulator 25 is the current path regulator 25B illustrated in FIG. 2B, the control device 8 performs control to turn on the contact-type switch element S2.

Then, while the clutch 11 is kept in the disconnected mode, the control device 8 controls the amount of power to be fed to the power generator 4 via the voltage converter 24 and the inverter 22 so that the output shaft 2a of the engine 2 may be driven to rotate at a predetermined starting engine speed by power of the power generator 4.

In this way, the control device 8 starts the operation of the engine 2 by controlling the fuel supply system, the throttle valve actuator, etc. of the engine 2 while the output shaft 2a of the engine 2 is driven to rotate (while the engine 2 is cranking).

When the current path regulator 25 is the current path regulator 25A or 25B illustrated in FIG. 2A or FIG. 2B, the engine 2 is started as described above. Then, after the engine 2 is started, the control process in the third CD mode described above is executed.

Note that, at the time of starting the engine 2 when the current path regulator 25 is the current path regulator 25C illustrated in FIG. 2C, the control device 8 controls the voltage converter 23 and the inverter 22 so that power for driving the output shaft 2a of the engine 2 to rotate at a starting engine speed may be fed to the power generator 4 from the first power storage device 6a.

Incidentally, even when the current path regulator 25 is the current path regulator 25A or 25B illustrated in FIG. 2A or FIG. 2B, it is also possible to make settings so that power may be fed to the power generator 4 from the first power storage device 6a at the time of starting the engine 2 if the remaining capacity SOC2 of the second power storage device 6b is small, for example.

Returning back to FIG. 3, while executing the process at STEP 5 or 6 as described above, the control device 8 acquires a detection value of the remaining capacity SOC1 of the first power storage device 6a at STEP 7, and judges whether or not the remaining capacity SOC1 is equal to or larger than the threshold TH_SOC at STEP 8.

If the judgment result at STEP 8 is negative, the control device 8 continues the processes from STEP 3.

On the other hand, if the judgment result at STEP 8 is positive, the control device 8 switches the operation mode of the power system 1 from the CD mode to the CS mode at STEP 9. Then, the control device 8 executes the control process in the CS mode until the first power storage device 6a and the second power storage device 6b are charged by the external power supply (STEP 10). Note that the control process in the CS mode is also executed even if the judgment result at STEP 2 is negative.

In the CS mode, the control device 8 constantly keeps the engine 2 in operation, and makes the clutch 11 operate in the connected mode while the vehicle is traveling. In addition, the control device 8 sets the vehicle demanded output Pv_dmd as in the case of the CD mode. Further, the control device 8 basically controls the output of the engine 2 so that the vehicle demanded output Pv_dmd may be achieved by power of the engine 2.

Note that, however, if the vehicle demanded output Pv_dmd exceeds a predetermined value, the control device 8 controls the operation of the engine 2 and the electric motor 3 so that the electric motor 3 may be responsible for a part of the vehicle demanded output Pv_dmd (i.e., the vehicle may travel in the parallel hybrid mode). In this case, at the time of the power running operation of the electric motor 3, power is fed to the electric motor 3 from the second power storage device 6b. Power is fed to the electric motor 3 as in the case of feeding power to the electric motor 3 in the second CD mode. Here, in the CS mode, no power running operation of the power generator 4 is performed.

Incidentally, it is also possible to make settings so that the vehicle may travel in the series hybrid mode, for example, in the CS mode. In this case, for example, the power generator 4 performs a power generating operation so that power for the power running operation of the electric motor 3 may be supplied by the power generated by the power generator 4 and, at the same time, the generated power is fed to the electric motor 3 so that the vehicle demanded output Pv_dmd may be achieved by power of the electric motor 3.

Meanwhile, the power generator 4 can perform a power generating operation in the first CD mode or the CS mode as needed. Further, in either of the operation modes, i.e., the CD mode and the CS mode, the electric motor 3 can perform a regenerative operation as needed at the time of decelerating the vehicle.

In this case, the power generated by the power generator 4 or the power regenerated by the electric motor 3 can be used to charge either of the first power storage device 6a and the second power storage device 6b. Note that, however, as described above, the first power storage device 6a with relatively high energy density is less resistant to deterioration from charging than the second power storage device 6b.

Figure 7:
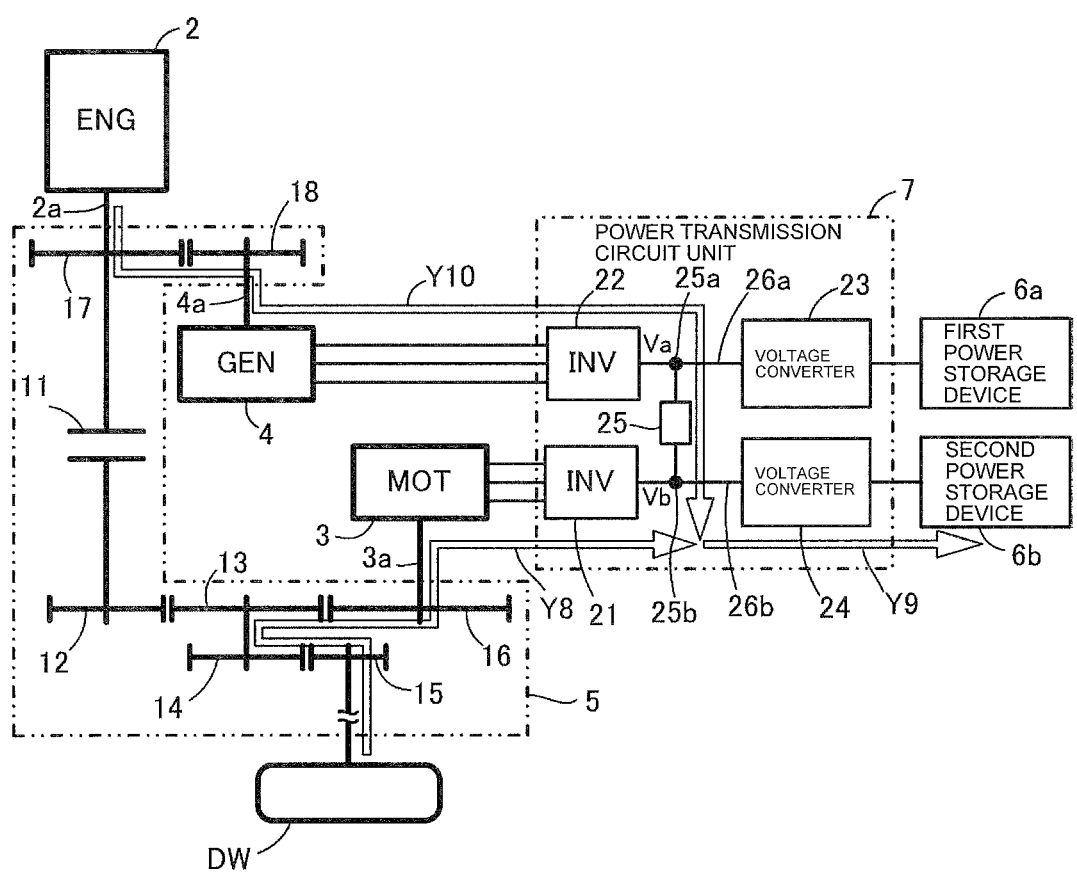
FIG. 7 is a diagram exemplifying the flow of energy at the time of regenerative operation of the electric motor of the power system according to the embodiment or at the time of power generating operation of the power generator thereof.

Thus, in this embodiment, the regenerative power of the electric motor 3 and the generated power of the power generator 4 are used to preferentially charge the second power storage device 6b as illustrated with arrows Y8, Y9, Y10 in FIG. 7.

In this case, during the regenerative operation of the electric motor 3, the control device 8 controls the inverter 21 and the voltage converter 24 to charge the second power storage device 6b with the regenerative power of the electric motor 3 via the inverter 21 and the voltage converter 24.

On the other hand, during the power generating operation of the power generator 4, the control device 8 controls the inverter 22 and the voltage converter 24 to charge the second power storage device 6b with the generated power of the power generator 4 via the inverter 22 and the voltage converter 24. In this case, when the current path regulator 25 is the current path regulator 25B illustrated in FIG. 2B, the control device 8 performs control to turn on the contact-type switch element S2.

Note that it is also possible to perform the power generating operation of the power generator 4 and the regenerative operation of the electric motor 3 at the same time. In this case, the control device 8 controls the inverters 21, 22 so that a voltage at the DC input/output unit of the inverter 22 (Va) may be higher than a voltage at the DC input/output unit of the inverter 21 (Vb) by the amount of voltage drop at the current path regulator 25.

Incidentally, although the generated power of the power generator 4 and the regenerative power of the electric motor 3 are used to charge only the second power storage device 6b in the above description, a part of the generated power of the power generator 4 and the regenerative power of the electric motor 3 may be used to charge the first power storage device 6a. Note that, however, in order to suppress deterioration of the first power storage device 6a as much as possible, it is preferable that, in a state where the second power storage device 6b is capable of being charged with power equal to or larger than a predetermined value, the generated power or the regenerative power be used to charge the second power storage device 6b as much as possible, and excessive power beyond the capacity of the second power storage device 6b be used to charge the first power storage device 6a.

As described above, according to this embodiment, it is possible to feed power to the electric motor 3 and the power generator 4 in a manner utilizing the characteristics of the first power storage device 6a and the second power storage device 6b especially in the second CD mode and the third CD mode in which power of both the first power storage device 6a and the second power storage device 6b is transmitted to the driving wheels DW.

Further, the first power storage device 6a and the second power storage device 6b are power storage devices whose specifications related to maximum power each device is capable of outputting are as described above. Moreover, the voltage converters 23, 24 are voltage converters whose specifications related to maximum power each converter is capable of transmitting are as described above. Thereby, it is possible to achieve a reduction in size or cost of the first and second power storage devices 6a, 6b and the voltage converters 23, 24 while achieving a large force of driving the driving wheels DW by means of power from both the electric motor 3 and the power generator 4.

Hereinabove, the embodiment of the present invention has been described; however, the present invention is not limited to the above embodiment.

For example, in the above embodiment, the description has been given of the case where the power system 1 is mounted in the vehicle (hybrid vehicle); however, the power system 1 may alternatively be used in transport equipment other than a vehicle such as a ship or a rail vehicle. In addition, besides the transport equipment, the power system 1 is applicable to a fixed type (floor type) device.

To accomplish the above objective, a power system according to the present embodiment includes: an internal combustion engine; an electric motor which is capable of performing a power running operation; a power generator which is capable of performing a power generating operation and a power running operation; a power transmission mechanism to which output shafts of the respective internal combustion engine, electric motor, and power generator are connected, which is capable of transmitting power of each of three power sources composed of the internal combustion engine, the electric motor, and the power generator to a driven load, and which is capable of transmitting power between the internal combustion engine and the power generator; a first power storage device and a second power storage device which respectively store power able to be fed to the electric motor and power able to be fed to the power generator; a power transmission circuit unit which is electrically connected to the electric motor, the power generator, and the first and second power storage devices so as to transmit power among the electric motor, the power generator, and the first and second power storage devices; and a control device which is configured to control operations of the respective internal combustion engine, electric motor, and power generator, the system being characterized in that the control device functions to execute a first control process of making both the electric motor and the power generator perform power running operations so as to transmit power of both the electric motor and the power generator to the driven load and, in the first control process, controls the power transmission circuit unit so as to feed power to the electric motor and the power generator using power of both the first power storage device and the second power storage device (first embodiment).

According to the first embodiment, through the first control process executed by the control device, power of both the electric motor and the power generator is transmitted to the driven load. Thereby, it is possible to drive the driven load with a large amount of power obtained by combining the power of the electric motor and the power of the power generator.

Further, in the situation of transmitting power of both the electric motor and the power generator to the driven load in this manner, power is fed to the electric motor and the power generator using power of both the first power storage device and the second power storage device. In other words, both the first power storage device and the second power storage device are responsible for total power required for the power running operations of both the electric motor and the power generator.

This reduces maximum output power that each of the first power storage device and the second power storage device needs to create as compared with the case where power is fed to both the electric motor and the power generator from only one of the first power storage device and the second power storage device. Thus, it is possible to lower the performance level of each of the first power storage device and the second power storage device required for transmitting power of both the electric motor and the power generator to the driven load.

Accordingly, the first embodiment makes it possible to transmit power of both the electric motor and the power generator to the driven load while using power of the two power storage devices in an appropriate form. In particular, since the required performance level of each of the first power storage device and the second power storage device can be lowered, it is possible to prevent an increase in size or cost of the first power storage device or the second power storage device.

In the first embodiment described above, it is preferable that the first power storage device and the second power storage device are power storage devices such that maximum power each device is capable of outputting is smaller than required maximum power which is maximum power required for the power running operations of both the electric motor and the power generator in the first control process, and that the sum of maximum power the first power storage device is capable of outputting and maximum power the second power storage device is capable of outputting is equal to or larger than the required maximum power (second embodiment).

According to this embodiment, a power storage device such that maximum power the device is capable of outputting is smaller than the required maximum power can be used as each of the first power storage device and the second power storage device. Thus, it is possible to achieve a reduction in size or cost of the first power storage device and the second power storage device while securing enough force of driving the driven load.

In the first or second embodiment described above, it is preferable that the power transmission circuit unit includes a voltage converter which is connected to any of the first power storage device and the second power storage device, and the voltage converter is a voltage converter such that maximum power the converter is capable of transmitting is smaller than required maximum power which is maximum power required for the power running operations of both the electric motor and the power generator in the first control process (third embodiment).

Alternatively, it is preferable that the power transmission circuit unit includes a first voltage converter which is connected to the first power storage device and a second voltage converter which is connected to the second power storage device, and the first voltage converter and the second voltage converter are voltage converters such that maximum power each converter is capable of transmitting is smaller than required maximum power which is maximum power required for the power running operations of both the electric motor and the power generator in the first control process, and that the sum of maximum power the first voltage converter is capable of transmitting and maximum power the second voltage converter is capable of transmitting is equal to or larger than the required maximum power (fourth embodiment).

According to the third embodiment, a voltage converter such that maximum power the converter is capable of transmitting is smaller than the required maximum power can be used as the voltage converter. Thus, it is possible to achieve a reduction in size or cost of the voltage converter or the power transmission circuit unit while securing enough force of driving the driven load.

Further, according to the fourth embodiment, a voltage converter such that maximum power the converter is capable of transmitting is smaller than the required maximum power can be used as the first voltage converter and the second voltage converter. Thus, it is possible to achieve a reduction in size or cost of the voltage converters or the power transmission circuit unit while securing enough force of driving the driven load.

In the first to fourth embodiments described above, it is preferable that the first power storage device is a power storage device with higher energy density than the second power storage device, and the second power storage device is a power storage device with higher power density than the first power storage device (fifth embodiment).

This makes it possible to configure the power transmission circuit unit or execute the first control process in a manner utilizing the characteristics of the respective first and second power storage devices.

More specifically, the fifth embodiment described above may have a configuration in which, when the power transmission circuit unit includes a first voltage converter which is connected to the first power storage device and a second voltage converter which is connected to the second power storage device, the second voltage converter is a voltage converter capable of transmitting larger power than the first voltage converter (sixth embodiment).

This makes it possible to output a large amount of power from the second power storage device with relatively high power density via the second voltage converter. In addition, by setting low the amount of power the first voltage converter is capable of transmitting, it is possible to achieve a reduction in size or cost of the first voltage converter.

In addition, in the fifth or sixth embodiment described above, it is preferable that, in the first control process, the control device controls the power transmission circuit unit so as to feed power of only the second power storage device out of the first power storage device and the second power storage device to the electric motor and feed power of only the first power storage device to the power generator (seventh embodiment).

According to this embodiment, since power of only the second power storage device with relatively high power density is fed to the electric motor in the first control process, the electric motor as a main power source for the driven load can generate a large amount of power. Further, since power of the power generator can be set low, it is possible to set low power to be fed to the power generator from the first power storage device with relatively high energy density.

Here, in general, the first power storage device with relatively high energy density is more prone to deteriorate when it discharges a large amount of power; however, since the power to be fed to the power generator from the first power storage device can be set low, it is possible to suppress deterioration of the first power storage device.

In addition, since the amount of power to be consumed in the first power storage device while the first control process is executed can be set low, it is possible to increase a period during which the first power storage device can feed power to the electric motor in a situation other than when the first control process is executed (specifically, a situation in which power of only the electric motor out of the electric motor and the power generator is transmitted to the driven load).

The first to seventh embodiments described above may have a configuration in which the power transmission circuit unit is capable of operating in: a decoupled mode in which a first current path through which a flowing current of the first power storage device flows and a second current path through which a flowing current of the second power storage device flows are electrically decoupled from each other so that the flow of current through between the first current path and the second current path is blocked; and a current-flow available mode in which the first current path and the second current path are electrically connected to each other so that the flow of current through between the first current path and the second current path is available, and the control device controls the power transmission circuit unit so that the power transmission circuit unit operates in the decoupled mode in the first control process (eighth embodiment).

According to this embodiment, it is possible to feed power of the first power storage device to only one of the electric motor and the power generator and feed power of the second power storage device to only one of the electric motor and the power generator in the first control process.

Thereby, it is possible to feed power of each of the first power storage device and the second power storage device to the corresponding one of the electric motor and the power generator that fits the characteristics of the power storage device. Thus, it is possible to feed power to the electric motor and the power generator in a manner utilizing the characteristics of the first power storage device and the second power storage device.

Note that the eighth embodiment may be used in combination with the seventh embodiment. In this case, in the first control process, the first current path serves as a current path for feeding power from the first power storage device to the power generator, and the second current path serves as a current path for feeding power from the second power storage device to the electric motor.

The eighth embodiment described above may have a configuration in which the power transmission circuit unit includes at least one of a diode and a switch element interposed between the first current path and the second current path, and any of the decoupled mode and the current-flow available mode is achieved selectively by controlling any of a voltage between both terminals of the diode and on/off of the switch element (ninth embodiment).

According to this embodiment, it is possible to achieve the decoupled mode and the current-flow available mode easily by controlling any of a voltage between both terminals of the diode and on/off of the switch element.

The first to ninth embodiments described above may have a configuration in which, when the first power storage device is a power storage device with higher energy density than the second power storage device and the second power storage device is a power storage device with higher power density than the first power storage device, the control device functions to make the power generator operate as a starting electric motor for the internal combustion engine by controlling the power transmission circuit unit so as to feed power of only the second power storage device out of the first power storage device and the second power storage device to the power generator at the time of starting the internal combustion engine (tenth embodiment).

According to this embodiment, power of the first power storage device with relatively high energy density is never used for starting the internal combustion engine. Thereby, it is possible to use the whole or a large part of power of the first power storage device as power for driving the driven load, and thus maximize a period during which the driven load can be driven by power of the electric motor.

In the first to tenth embodiments described above, it is preferable that, when the first power storage device is a power storage device with higher energy density than the second power storage device and the second power storage device is a power storage device with higher power density than the first power storage device, the control device functions to control the internal combustion engine and the power transmission circuit unit so that the power generator performs a power generating operation by means of power of the internal combustion engine, and controls the power transmission circuit unit so that, during the power generating operation of the power generator, power generated by the power generator is used to preferentially charge the second power storage device out of the first power storage device and the second power storage device (eleventh embodiment).

Besides, in the first to eleventh embodiments described above, it is preferable that, when the first power storage device is a power storage device with higher energy density than the second power storage device, the second power storage device is a power storage device with higher power density than the first power storage device, and the electric motor is an electric motor capable of performing a power running operation and a regenerative operation, the control device controls the power transmission circuit unit so that, during the regenerative operation of the electric motor, regenerative power generated by the electric motor is used to preferentially charge the second power storage device out of the first power storage device and the second power storage device (twelfth embodiment).

Here, the first power storage device with relatively high energy density is generally less resistant to deterioration from charging than the second power storage device with relatively high power density (i.e., more prone to deteriorate due to charging).

Accordingly, in the eleventh embodiment or the twelfth embodiment, the generated power of the power generator or the regenerative power of the electric motor is used to preferentially charge the second power storage device out of the first power storage device and the second power storage device. Thereby, it is possible to prevent depletion of power of the second power storage device with relatively high power density, and minimize deterioration of the first power storage device with relatively high energy density.

The first to twelfth embodiments described above may have a configuration in which, when the first power storage device is a power storage device with higher energy density than the second power storage device and the second power storage device is a power storage device with higher power density than the first power storage device, the control device is capable of selectively executing: a control process in a Charge Depleting (CD) mode in which the power system is operated so as to consume power of at least the first power storage device out of the first power storage device and the second power storage device; and a control process in a Charge Sustaining (CS) mode in which the power system is operated so as to suppress a power reduction of the first power storage device (thirteenth embodiment).

Note that, in the thirteenth embodiment, "consuming power stored in the first power storage device" is not limited to simply decreasing the remaining capacity (the amount of power stored) in the first power storage device, but may include a period in which the remaining capacity in the first power storage device is temporarily increased by power generated by the power generator or charging of regenerative power from the electric motor.

According to the thirteenth embodiment, in the CD mode, power of the first power storage device with relatively high energy density can be used actively. Thus, it is possible to maximize a period during which the driven load can be driven by using power of the electric motor or power of both the electric motor and the power generator without using power of the internal combustion engine. Meanwhile, in the CS mode, it is possible to drive the driven load by using power of the internal combustion engine and, by using power of the second power storage device or the generated power of the power generator, it is also possible to drive the driven load while supplementarily using power of the electric motor.

In the thirteenth embodiment described above, it is preferable that, in the CD mode, the control device executes the first control process if a requirement in which a demanded output for driving the driven load is equal to or larger than a predetermined value is satisfied (fourteenth embodiment).

According to this embodiment, in the CD mode, it is possible to transmit a large amount of power to the driven load with no need of or almost no need of power of the internal combustion engine. Thereby, the environmental performance of the power system in the CD mode can be enhanced.

Besides, transport equipment according to the present embodiment is characterized by including the power system according to the first to fourteenth embodiments described above (fifteenth embodiment).

According to this embodiment, it is possible to provide transport equipment which can bring about the effects described in relation to the first to fourteenth embodiments.

Further, a method of operating a power system according to the present embodiment is characterized by including: an internal combustion engine; an electric motor which is capable of performing a power running operation; a power generator which is capable of performing a power generating operation and a power running operation; a power transmission mechanism to which output shafts of the respective internal combustion engine, electric motor, and power generator are connected, which is capable of transmitting power of each of three power sources composed of the internal combustion engine, the electric motor, and the power generator to a driven load, and which is capable of transmitting power between the internal combustion engine and the power generator; and a first power storage device and a second power storage device which respectively store power able to be fed to the electric motor and power able to be fed to the power generator, the method being characterized by including the step of making both the electric motor and the power generator perform power running operations so as to transmit power of both the electric motor and the power generator to the driven load, the method being characterized in that, in the step, power is fed to the electric motor and the power generator using power of both the first power storage device and the second power storage device (sixteenth embodiment).

According to this embodiment, it is possible to bring about the same effect as in the first embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A power system comprising:
an internal combustion engine;
an electric motor which is capable of performing a power running operation;
a power generator which is capable of performing a power generating operation and a power running operation;
a power transmission mechanism to which output shafts of said respective internal combustion engine, electric motor, and power generator are connected, which is capable of transmitting power of each of three power sources composed of said internal combustion engine, said electric motor, and said power generator to a driven load, and which is capable of transmitting power between said internal combustion engine and said power generator;
a first power storage device and a second power storage device which respectively store power able to be fed to said electric motor and power able to be fed to said power generator;
a power transmission circuit unit which is electrically connected to said electric motor, said power generator, and said first and second power storage devices so as to transmit power among said electric motor, said power generator, and said first and second power storage devices; and
a control device which is configured to control operations of said respective internal combustion engine, electric motor, and power generator, wherein
said control device functions to execute a first control process of making both said electric motor and said power generator perform power running operations so as to transmit power of both said electric motor and said power generator to said driven load and, in said first control process, controls said power transmission circuit unit so as to feed power to said electric motor and said power generator using power of both said first power storage device and said second power storage device,
wherein said first power storage device is a power storage device with higher energy density than said second power storage device, and said second power storage device is a power storage device with higher power density than said first power storage device, and
wherein, in said first control process, said control device controls said power transmission circuit unit so as to feed power of only said second power storage device out of said first power storage device and said second power storage device to said electric motor and feed power of only said first power storage device to said power generator.

2. The power system according to claim 1, wherein said first power storage device and said second power storage device are power storage devices such that maximum power each device is capable of outputting is smaller than required maximum power which is maximum power required for the power running operations of both said electric motor and said power generator in said first control process, and that the sum of maximum power said first power storage device is capable of outputting and maximum power said second power storage device is capable of outputting is equal to or larger than said required maximum power.

3. The power system according to claim 1, wherein said power transmission circuit unit includes a voltage converter which is connected to any of said first power storage device and said second power storage device, and said voltage converter is a voltage converter such that maximum power said converter is capable of transmitting is smaller than required maximum power which is maximum power required for the power running operations of both said electric motor and said power generator in said first control process.

4. The power system according to claim 1, wherein said power transmission circuit unit includes a first voltage converter which is connected to said first power storage device and a second voltage converter which is connected to said second power storage device, and said first voltage converter and said second voltage converter are voltage converters such that maximum power each converter is capable of transmitting is smaller than required maximum power which is maximum power required for the power running operations of both said electric motor and said power generator in said first control process, and that the sum of maximum power said first voltage converter is capable of transmitting and maximum power said second voltage converter is capable of transmitting is equal to or larger than said required maximum power.

5. The power system according to claim 1, wherein said power transmission circuit unit includes a first voltage converter which is connected to said first power storage device and a second voltage converter which is connected to said second power storage device, and said second voltage converter is a voltage converter capable of transmitting larger power than said first voltage converter.

6. The power system according to claim 1, wherein
said power transmission circuit unit is capable of operating in: a decoupled mode in which a first current path through which a flowing current of said first power storage device flows and a second current path through which a flowing current of said second power storage device flows are electrically decoupled from each other so that the flow of current through between said first current path and said second current path is blocked; and a current-flow available mode in which said first current path and said second current path are electrically connected to each other so that the flow of current through between said first current path and said second current path is available, and
said control device controls said power transmission circuit unit so that said power transmission circuit unit operates in said decoupled mode in said first control process.

7. The power system according to claim 6, wherein said power transmission circuit unit includes at least one of a diode and a switch element interposed between said first current path and said second current path, and any of said decoupled mode and said current-flow available mode is achieved selectively by controlling any of a voltage between both terminals of said diode and on/off of said switch element.

8. The power system according to claim 1, wherein
said first power storage device is a power storage device with higher energy density than said second power storage device,
said second power storage device is a power storage device with higher power density than said first power storage device, and
said control device functions to make said power generator operate as a starting electric motor for said internal combustion engine by controlling said power transmission circuit unit so as to feed power of only said second power storage device out of said first power storage device and said second power storage device to said power generator at the time of starting said internal combustion engine.

9. The power system according to claim 1, wherein
said first power storage device is a power storage device with higher energy density than said second power storage device,
said second power storage device is a power storage device with higher power density than said first power storage device, and
said control device functions to control said internal combustion engine and said power transmission circuit unit so that said power generator performs a power generating operation by means of power of said internal combustion engine, and controls said power transmission circuit unit so that, during the power generating operation of said power generator, power generated by said power generator is used to preferentially charge said second power storage device out of said first power storage device and said second power storage device.

10. The power system according to claim 1, wherein
said first power storage device is a power storage device with higher energy density than said second power storage device,
said second power storage device is a power storage device with higher power density than said first power storage device,
said electric motor is an electric motor capable of performing a power running operation and a regenerative operation, and
said control device controls said power transmission circuit unit so that, during the regenerative operation of said electric motor, regenerative power generated by said electric motor is used to preferentially charge said second power storage device out of said first power storage device and said second power storage device.

11. The power system according to claim 1, wherein
said first power storage device is a power storage device with higher energy density than said second power storage device,
said second power storage device is a power storage device with higher power density than said first power storage device, and
said control device is capable of selectively executing: a control process in a Charge Depleting (CD) mode in which said power system is operated so as to consume power of at least said first power storage device out of said first power storage device and said second power storage device; and a control process in a Charge Sustaining (CS) mode in which said power system is operated so as to suppress a power reduction of said first power storage device.

12. The power system according to claim 11, wherein, in said CD mode, said control device executes said first control process if a requirement in which a demanded output for driving said driven load is equal to or larger than a predetermined value is satisfied.

13. A power system comprising:
an internal combustion engine to drive a driven load;
an electric motor to drive the driven load;
a power generator to generate electric power and to drive the driven load;
a power transmission mechanism via which power is transmitted from the internal combustion engine, the electric motor, and the power generator to the driven load and via which power is transmitted between the internal combustion engine and the power generator;

a first power storage and a second power storage to store electric power fed to the electric motor and to the power generator;

a power transmission circuit electrically connecting the electric motor, the power generator, the first power storage, and the second power storage so as to transmit electric power from the first power storage and the second power storage to the electric motor and the power generator; and a processor configured to control the power transmission circuit such that the first power storage and the second power storage feed electric power to the electric motor and the power generator, wherein the first power storage is a power storage with higher energy density than the second power storage, and the second power storage is a power storage with higher power density than the first power storage, and wherein the processor controls the power transmission circuit for running operations of the electric motor and the power generator so as to feed electric power of only the second power storage out of the first power storage and the second power storage to the electric motor and feed electric power of only the first power storage to the power generator.

14. The power system according to claim 13, wherein the first power storage and the second power storage are power storages such that maximum power each storage is to output is smaller than required maximum power which is maximum power required for power running operations of the electric motor and the power generator, and that the sum of maximum power the first power storage is to output and maximum power the second power storage is to output is equal to or larger than the required maximum power.

15. The power system according to claim 13, wherein the power transmission circuit includes a voltage converter which is connected to any of the first power storage and the second power storage, and the voltage converter is a voltage converter such that maximum power the converter is to transmit is smaller than required maximum power which is maximum power required for power running operations of the electric motor and the power generator.

16. The power system according to claim 13, wherein the power transmission circuit includes a first voltage converter which is connected to the first power storage and a second voltage converter which is connected to the second power storage, and the first voltage converter and the second voltage converter are voltage converters such that maximum power each converter is to transmit is smaller than required maximum power which is maximum power required for power running operations of the electric motor and the power generator, and that the sum of maximum power the first voltage converter is to transmit and maximum power the second voltage converter is to transmit is equal to or larger than the required maximum power.

17. The power system according to claim 13, wherein the power transmission circuit includes a first voltage converter which is connected to the first power storage and a second voltage converter which is connected to the second power storage, and the second voltage converter is a voltage converter to transmit larger power than the first voltage converter.

18. The power system according to claim 13, wherein
the power transmission circuit is to operate in: a decoupled mode in which a first current path through which a flowing current of the first power storage flows and a second current path through which a flowing current of the second power storage flows are electrically decoupled from each other so that the flow of current through between the first current path and the second current path is blocked; and a current-flow available mode in which the first current path and the second current path are electrically connected to each other so that the flow of current through between the first current path and the second current path is available, and the processor controls the power transmission circuit for running operations of the electric motor and the power generator so that the power transmission circuit operates in the decoupled mode.

19. The power system according to claim 18, wherein the power transmission circuit includes at least one of a diode and a switch element interposed between the first current path and the second current path, and any of the decoupled mode and the current-flow available mode is achieved selectively by controlling any of a voltage between both terminals of the diode and on/off of the switch element.

20. The power system according to claim 13, wherein
the first power storage is a power storage with higher energy density than the second power storage,
the second power storage is a power storage with higher power density than the first power storage, and
the processor makes the power generator operate as a starting electric motor for the internal combustion engine by controlling the power transmission circuit so as to feed electric power of only the second power storage out of the first power storage and the second power storage to the power generator at the time of starting the internal combustion engine.

21. The power system according to claim 13, wherein
the first power storage is a power storage with higher energy density than the second power storage,
the second power storage is a power storage with higher power density than the first power storage, and
the processor controls the internal combustion engine and the power transmission circuit so that the power generator performs a power generating operation by power of the internal combustion engine, and controls the power transmission circuit so that, during the power generating operation of the power generator, power generated by the power generator is used to preferentially charge the second power storage out of the first power storage and the second power storage.

22. The power system according to claim 13, wherein
the first power storage is a power storage with higher energy density than the second power storage,
the second power storage is a power storage with higher power density than the first power storage,
the electric motor is an electric motor to perform a power running operation and a regenerative operation, and
the processor controls the power transmission circuit so that, during the regenerative operation of the electric motor, regenerative power generated by the electric motor is used to preferentially charge the second power storage out of the first power storage and the second power storage.

23. The power system according to claim 13, wherein
the first power storage is a power storage with higher energy density than the second power storage,
the second power storage is a power storage with higher power density than the first power storage, and
the processor is to selectively execute: a control process in a Charge Depleting (CD) mode in which the power system is operated so as to consume power of at least the first power storage out of the first power storage and the second power storage; and a control process in a Charge Sustaining (CS) mode in which the power system is operated so as to suppress a power reduction of the first power storage.

24. The power system according to claim 23, wherein, in the CD mode, the processor controls the power transmission circuit such that the first power storage and the second power storage feed the electric power to the electric motor and the power generator if a requirement in which a demanded output for driving the driven load is equal to or larger than a predetermined value is satisfied.

25. Transport equipment comprising:
a vehicle including one of an automotive vehicle, a ship, and a rail vehicle; and
the power system according to claim 13.

26. A method for operating a power system comprising:
an internal combustion engine to drive a driven load;
an electric motor to drive the driven load;
a power generator to generate electric power and to drive the driven load;
a power transmission mechanism via which power is transmitted from the internal combustion engine, the electric motor, and the power generator to the driven load and via which power is transmitted between the internal combustion engine and the power generator;
a first power storage and a second power storage which respectively store power able to be fed to the electric motor and power able to be fed to the power generator; and
a processor configured to control a power transmission circuit interconnecting the first power storage, the second power storage, the electric motor and the power generator such that the first power storage and the second power storage feed electric power to the electric motor and the power generator, wherein the first power storage is a power storage with higher energy density than the second power storage, and the second power storage is a power storage with higher power density than the first power storage, and
wherein the processor controls the power transmission circuit for running operations of the electric motor and the power generator so as to feed electric power of only the second power storage out of the first power storage and the second power storage to the electric motor and feed electric power of only the first power storage to the power generator, the method comprising:
storing electric power in the first power storage and the second power storage; and
feeding electric power from the first power storage and the second power storage to the electric motor and the power generator.

* * * * *